US012699773B2

(12) United States Patent (10) Patent No.: US 12,699,773 B2
Song et al. (45) Date of Patent: Aug. 4, 2026

(54) METHOD AND APPARATUS FOR CLONE SEARCH

(71) Applicant: BlackBerry Limited, Waterloo (CA)

(72) Inventors: Zhizhou Song, Kingston (CA); Honghui Ding, Kingston (CA); Yuan Tian, Kingston (CA); Li Tao Li, Toronto (CA); Weihan Ou, Vancouver (CA)

(73) Assignee: BlackBerry Limited, Waterloo (CA)

( * ) Notice: Subject to any disclaimer, the term of this patent is extended or adjusted under 35 U.S.C. 154(b) by 179 days.

(21) Appl. No.: 18/482,511

(22) Filed: Oct. 6, 2023

(65) Prior Publication Data

US 2024/0134984 A1 Apr. 25, 2024

Related U.S. Application Data

(60) Provisional application No. 63/417,204, filed on Oct. 18, 2022.

(51) Int. Cl.
G06F 21/00 (2013.01)
G06F 21/56 (2013.01)

(52) U.S. Cl.
CPC ...... G06F 21/566 (2013.01); *G06F 2221/033* (2013.01)

(58) Field of Classification Search
CPC .......................... G06F 21/566; G06F 2221/033
See application file for complete search history.

(56) References Cited

U.S. PATENT DOCUMENTS

| | | | |
|---|---|---|---|
| 11,184,370 B1 * | 11/2021 | Shen | H04L 63/1416 |
| 11,436,330 B1 * | 9/2022 | Jennings | G06F 21/563 |
| 2020/0120110 A1 | 4/2020 | Stokes, III et al. | |
| 2021/0234880 A1 * | 7/2021 | McLane | G06F 21/55 |
| 2021/0240691 A1 * | 8/2021 | Bertoni Scarton | G06F 40/205 |
| 2022/0027465 A1 * | 1/2022 | Hercock | G06F 21/554 |
| 2023/0153280 A1 * | 5/2023 | Rout | G06N 3/045 |
| | | | 706/25 |

FOREIGN PATENT DOCUMENTS

CN      112559978 A      3/2021

OTHER PUBLICATIONS

Abhishek et al., Detecting Obfuscated Viruses Using Cosine Similarity Analysis, pp. 1-6 (from Applicant's IDS) (Year: 2007).*
Bachman & Precup, "Data Generation as Sequential Decision Making", Advances in Neural Information Processing Systems 28 (NIPS 2015), 2015, 9 pages.
Bahdanau et al., "Neural Machine Translation by Jointly Learning to Align and Translate", published as a conference paper at ICLR 2015, 2016 (version v7), 15 pages.

(Continued)

*Primary Examiner* — Ghazal B Shehni
(74) *Attorney, Agent, or Firm* — Moffat & Co

(57) ABSTRACT

There is provided a method and apparatus for identifying malicious code. The method uses machine learning to compare a new code segment to known code segments of malicious code. Code segments are converted to vectors and the cosine similarity of two vectors is used to identify clones. Techniques to train a neural network for handling very long code sequences and obfuscated malicious code are used.

17 Claims, 10 Drawing Sheets

(56) References Cited

OTHER PUBLICATIONS

Campos et al., "Skip RNN: Learning to Skip State Updates in Recurrent Neural Networks", published as a conference paper at ICLR 2018, 2018 (version v3), 17 pages.

Chen et al., "Achieving Accuracy and Scalability Simultaneously in Detecting Application Clones on Android Markets", in Proceedings of the 36th International Conference on Software Engineering (ICSE '14), 2014, 12 pages.

Cho et al., "On the Properties of Neural Machine Translation: Encoder-Decoder Approaches", Eighth Workshop on Syntax, Semantics and Structure in Statistical Translation (SSST-8), 2014, pp. 103-111.

Collberg et al., "A Taxonomy of Obfuscating Transformations", Computer Science Technical Report #148, 1997, 36 pages.

Ding et al., "Kam1n0: MapReduce-based Assembly Clone Search for Reverse Engineering", in Proceedings of the 22nd ACM SIGKDD International Conference on Knowledge Discovery and Data Mining (KDD '16), 2016, 10 pages.

Ding et al., "Asm2Vec: Boosting Static Representation Robustness for Binary Clone Search against Code Obfuscation and Compiler Optimization", in 2019 IEEE Symposium on Security and Privacy, 2019, 18 pages.

Fass et al., "HideNoSeek: Camouflaging Malicious JavaScript in Benign ASTs", in 2019 ACM SIGSAC Conference on Computer and Communications Security (CCS '19), 2019, 15 pages.

Feichtner & Rabensteiner, "Obfuscation-Resilient Code Recognition in Android Apps", in Proceedings of the 14th International Conference on Availability, Reliability and Security (ARES '19), 2019, 10 pages.

Feng et al., "CodeBERT: A Pre-Trained Model for Programming and Natural Languages", Findings of the Association for Computational Linguistics: EMNLP 2020, 2020, pp. 1536-1547.

Hindle et al., "On the Naturalness of Software", Communications of the ACM vol. 59 No. 5, May 2016, pp. 122-131.

Huang et al., "Leap-LSTM: Enhancing Long Short-Term Memory for Text Categorization", in Proceedings of the Twenty-Eighth International Joint Conference on Artificial Intelligence (IJCAI-19), 2019, pp. 5017-5023.

Jiang et al., "DECKARD: Scalable and accurate tree-based detection of code clones", in ICSE 2007: Proceedings of the 29th International Conference on Software Engineering, 2007, pp. 96-105.

Kamiya et al., "CCFinder: A multilinguistic token-based code clone detection system for large scale source code", IEEE Transactions on Software Engineering vol. 28 No. 7, Jul. 2002, pp. 654-670.

KULKARNI & Metta, "A Code Obfuscation Framework Using Code Clones", in Proceedings of the 22nd International Conference on Program Comprehension (ICPC '14), 2014, 5 pages.

Kulkarni & Metta, "A New Code Obfuscation Scheme for Software Protection", in 2014 IEEE 8th International Symposium on Service Oriented System Engineering, 2014, 6 pages.

László & Kiss, "Obfuscating C++ Programs via Control Flow Flattening", Annales Universitatis Scientarum Budapestinensis de Rolando Eötvös Nominatae, Sectio Computatorica, 30(1), 2009, pp. 3-19.

Lee et al., "Instant Code Clone Search", in Proceedings of the Eighteenth ACM SIGSOFT International Symposium on Foundations of Software Engineering (FSE '10), 2010, 10 pages.

Likarish et al., "Obfuscated Malicious Javascript Detection using Classification Techniques", in 2009 4th International Conference on Malicious and Unwanted Software (MALWARE), 2009, 8 pages.

Liu et al., "VFDETECT: A Vulnerable Code Clone Detection System Based on Vulnerable Fingerprint", in 2017 IEEE 3rd Information Technology and Mechatronics Engineering Conference (ITOEC), 2017, pp. 548-553.

Ndichu et al., "A machine learning approach to detection of JavaScript-based attacks using AST features and paragraph vectors", Applied Soft Computing Journal vol. 84 105721, 2019, 11 pages.

Ranzato et al., "Sequence Level Training with Recurrent Neural Networks", published as a conference paper at ICLR 2016, 2016 (version v7), 16 pages.

Sajnani et al., "SourcererCC: Scaling Code Clone Detection to Big Code", preprint in Proceedings of the 38th International Conference on Software Engineering (ICSE '16), 2015 (version v1), 12 pages.

Sutskever et al., "Sequence to Sequence Learning with Neural Networks", Advances in Neural Information Processing Systems 27 (NIPS 2014), 2014, 9 pages.

Sutton et al., "Policy Gradient Methods for Reinforcement Learning with Function Approximation", Advances in Neural Information Processing Systems 12 (NIPS 1999), 2000, pp. 1057-1063.

Svaljenko & Roy, "Evaluating Clone Detection Tools with BigCloneBench", in 2015 IEEE International Conference on Software Maintenance and Evolution (ICSME), 2015, pp. 131-140.

Van Erven & Harremoës "Renyi Divergence and Kullback-Leibler Divergence", IEEE Transactions on Information Theory vol. 60 Issue 7, 2014 (version v2), 24 pages.

Vaswani et al., "Attention Is All You Need", 31st Conference on Neural Information Processing Systems (NIPS 2017), 2017, 11 pages.

Walker et al., "Open-Source Tools and Benchmarks for Code-Clone Detection: Past, Present, and Future Trends", Applied Computing Review vol. 19 No. 4, 2019, pp. 28-39.

Wei & Li, "Supervised Deep Features for Software Functional Clone Detection by Exploiting Lexical and Syntactical Information in Source Code", in Proceedings of the Twenty-Sixth International Joint Conference on Artificial Intelligence (IJCAI-17), 2017, pp. 3034-3040.

White et al., "Deep Learning Code Fragments for Code Clone Detection", 2016 31st IEEE/ACM International Conference on Automated Software Engineering (ASE '16), 2016, 12 pages.

Williams, "Simple Statistical Gradient-Following Algorithms for Connectionist Reinforcement Learning", Machine Learning vol. 8, 1992, pp. 229-256.

Yu et al., "Neural Detection of Semantic Code Clones via Tree-Based Convolution", in 2019 IEEE/ACM 27th International Conference on Program Comprehension (ICPC), 2019, pp. 70-80.

Yu et al., "SeqGAN: Sequence Generative Adversarial Nets with Policy Gradient", in Proceedings of the Thirty-First AAAI Conference on Artificial Intelligence (AAAI-17), 2017, pp. 2852-2858.

Zhao & Huang, "DeepSim: Deep Learning Code Functional Similarity", in Proceedings of the 26th ACM Joint European Software Engineering Conference and Symposium on the Foundations of Software Engineering (ESEC/FSE '18), 2018, pp. 141-151.

Mou et al., "Convolutional Neural Networks over Tree Structures for Programming Language Processing", in Proceedings of the Thirtieth AAAI Conference on Artificial Intelligence (AAAI-16), 2016, pp. 1287-1293.

Zhang et al., "A Novel Neural Source Code Representation Based on Abstract Syntax Tree", in 2019 IEEE/ACM 41st International Conference on Software Engineering (ICSE), 2019, pp. 783-794.

European Patent Office (EPO) Extended European Search Report (EESR) for U.S. Appl. No. 23/203,635 dated Feb. 15, 2024, 10 pages.

Li et al., "I-MAD: A Novel Interpretable Malware Detector Using Hierarchical Transformer", arXiv preprint arXiv:1909.06865v2 (2019), 12 pages.

Karnik et al., "Detecting Obfuscated Viruses Using Cosine Similarity Analysis", Proceedings of the First Asia International Conference on Modelling & Simulation (AMS '07), 2007, IEEE, 6 pages.

* cited by examiner

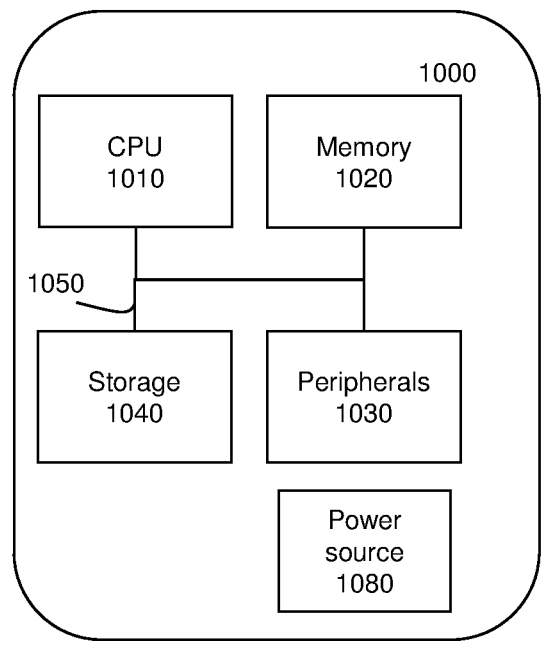
FIGURE
10

METHOD AND APPARATUS FOR CLONE SEARCH

FIELD OF THE DISCLOSURE

The present disclosure relates to a method for searching for code clones. More specifically, the present disclosure relates to a method for searching for code clones in which the code has been obfuscated.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Software engineering widely adopts open-source projects and typically relies on public package management systems. However, such code may comprise malicious code, especially when the validity and integrity of the code is not verified. Even for popular repositories that are security-critical, e.g., operating system or database repositories, their pull requests (PRs) are not constantly reviewed due to the complexity of PRs and the credibility of contributors. As a result, one can sneak in malicious code through a simple pull request.

Additionally, most software project management sites have free continuous-integration and continuous-deployment (CI/CD) tools that can also be abused. For example, GitHub Actions, a free CI/CD tool, has been abused by attackers for cryptocurrency mining via commits and forks, that has caused a significant loss of computing resources. In addition, recent attacks against the npm package repository affected 13 million USD in cryptocurrency. Copy-and-paste code snippets from the Internet, another widely uncontrollable practice in software development, further escalates the situation.

However, the malicious code in these attacks is hard to detect due to several factors, and the most important one is that the malicious code is injected into a large trunk of benign code, and such code can be further obfuscated to obscure its context meanings.

Obfuscation techniques are widely used to protect authorship and reverse engineering. On the other hand, obfuscated code makes it more difficult for security engineers to find intellectual property infringement and detect malicious code mixed into benign code.

There are many types of obfuscation techniques. Some of them, like variables renaming, string splitting, or spacing, have a low impact on the code structure. Others, such as array rotation, wrapping, control flow flattening, or dead code injection, can have a significant impact on code structure. For some dynamic typing languages or script languages, obfuscation can even reform node properties, like interchanging strings and hexadecimal numbers.

JavaScript is a dynamic typing, interpreted programming language. Its flexible syntax boosts the speed of development and adaptation to new requirements so that it is widely used across all browsers. Over time, millions of JavaScript libraries have been developed and uploaded for free usage. In practice, JavaScript code is often obfuscated by software developers and threat actors into a more obscure form concealing its purpose by replacing meaningful functions and variable identifiers with random-looking strings.

As shown below, a simple JavaScript code snippet for uploading an email and password is obfuscated to a rather complicated one. While these two code snippets perform the same function, they look entirely different from each other and the obfuscated code is not easily recognized as a clone of the original code.

```
$.ajax({                          (Original Code)
    url: "SomeUrl",
    type: "POST",
    dataType: "html",
    data: {
        Email: email,
        password: password
    }
})
function _0x25ae( ){var _0x2621bd=['\x74\x79\x70\x65'];_0x25ae=
function( ){return _0x2621bd;};return _0x25ae( );}function
_0x4692(_0x76ca2,_0x2282c2){var _0x497e69=_0x25ae( );
_0x4692=function(_0x1314ca,_0x1b5458){_0x1314ca=_0x1314ca-(-
0x833+0x640*0x3+0xa8d*-0x1);var _0x447be9=_0x497e69[_0x1314ca];
return _0x447be9;};return _0x4692(_0x76ca2,_0x2282c2);}var
_0x129cf1={};_0x129cf1['\x6c\x65\x58\x76\x49']='\x50\x4f\x53\x54';   (Obfuscated
_0x129cf1['\x56\x52\x4c\x70\x56']='\x68\x74\x6d\x6c';var _0x3f2652=    Code)
_0x129cf1;var _0x5b51c8={};_0x5b51c8['\x45\x6d\x61\x69\x6c']=
_0x36d406;_0x5b51c8['\x70\x61\x73\x73\x77\x6f\x72\x64']=_0x48adef;var
_0x34c9c9={};_0x34c9c9['\x75\x72\x6c']='\x53\x6f\x6d\x65\x55\x72\x6c';
_0x34c9c9[_0x4692(0x0)]=_0x3f2652['\x6c\x65\x58\x76\x49'];_0x34c9c9
['\x64\x61\x74\x61\x54\x79\x70\x65']=_0x3f2652['\x56\x52\x4c\x70\x56'];
_0x34c9c9['x64\x61\x74\x61']=_0x5b51c8;$['\x61\x6a\x61\x78'](_0x34c9c9);
```

There are a variety of existing tools can be leveraged for code clone search. Such tools are described in, for example, S. H. Ding, B. C. Fung, and P. Charland, *Kam1n0: Mapreduce-based assembly clone search for reverse engineering*, Proceedings of the 22nd ACM SIGKDD International Conference on Knowledge Discovery and Data Mining, pages 461-470, 2016; S. H. Ding, B. C. Fung, and P. Charland, *Asm2vec: Boosting static representation robustness for binary clone search against code obfuscation and compiler optimization*, 2019 IEEE Symposium on Security and Privacy (SP), pages 472-489, IEEE, 2019; L. Jiang, G. Misherghi, Z. Su, and S. Glondu. *Deckard: Scalable and accurate tree-based detection of code clones*, 29th International Conference on Software Engineering (ICSE'07), pages 96-105, IEEE, 2007; S. Ndichu, S. Kim, S. Ozawa, T. Misu, and K. Makishima, *A machine learning approach to detection of*

*javascript-based attacks using ast features and paragraph vectors, Applied Soft Computing,* 84:105721, 2019; H. Sajnani, V. Saini, J. Svajlenko, C. K. Roy, and C. V. Lopes, *Sourcerercc: Scaling code clone detection to big-code, Proceedings of the 38th International Conference on Software Engineering,* pages 1157-1168, 2016, incorporated herein by reference.

These tools utilize different types of techniques such as fingerprinting or hashing, token-based comparison, tree-based comparison, and hex differing to capture the syntactic or semantic similarity between two code snippets. However, most clone pairs are syntactically different and scattered among a long sequence of code.

In addition, there are also studies focusing on inventing obfuscation techniques that can breach existing clone search tools, such as A. Fass, M. Backes, and B. Stock. *Hidenoseek: Camouflaging malicious javascript in benign asts, Proceedings of the 2019 ACM SIGSAC Conference on Computer and Communications Security,* pages 1899-1913, 2019; A. Kulkarni and R. Metta, *A code obfuscation framework using code clones, Proceedings of the 22nd International Conference on Program Comprehension,* pages 295-299, 2014; A. Kulkarni and R. Metta, *A new code obfuscation scheme for software protection,* 2014 *IEEE 8th International Symposium on Service Oriented System Engineering,* pages 409-414. IEEE, 2014; T. Laszlo and A. Kiss, *Obfuscating c++ programs via control flow flattening, Annales Universitatis Scientarum Budapestinensis de RolandoEotvos Nominatae, Sectio Computatorica,* 30(1):3-19, 2009, incorporated herein by reference.

In summary, existing solutions cannot mitigate the syntactic variations against code obfuscation and identify the semantic connections between the original code and the obfuscated one.

SUMMARY

According to at least one embodiment of the present disclosure, there is provided a method at a computing device for identifying malicious software, comprising a) encoding a first software file using an encoder model to create a first encoded vector; b) selecting a malware file from a database of malware files; c) encoding the malware file using the encoder model to create a second encoded vector; d) computing a cosine similarity between the first encoded vector and the second encoded vector; and e) determining whether the first software file is a clone of the malware file based on the cosine similarity.

According to at least another embodiment of the present disclosure, there is provided a computing device for identifying malicious software, comprising: a processor; and memory; wherein the processor and the memory cooperate to: a) encode a first software file using an encoder model to create a first encoded vector; b) select a malware file from a database of malware files; c) encode the malware file using the encoder model to create a second encoded vector; d) compute a cosine similarity between the first encoded vector and the second encoded vector; and e) determine whether the first software file is a clone of the malware file based on the cosine similarity.

According to yet another embodiment of the present disclosure, there is provided a computer readable medium having stored thereon executable code for execution by a processor of a computing device, the executable code comprising instructions for: a) encoding a first software file using an encoder model to create a first encoded vector; b) selecting a malware file from a database of malware files; c)

encoding the malware file using the encoder model to create a second encoded vector; d) computing a cosine similarity between the first encoded vector and the second encoded vector; and e) determining whether the first software file is a clone of the malware file based on the cosine similarity.

BRIEF DESCRIPTION OF THE DRAWINGS

The present disclosure will be better understood having regard to the drawings in which:

FIG. 10 is a block diagram of a computing device for performing the methods disclosed herein.

DETAILED DESCRIPTION OF THE DRAWINGS

Figure 1:
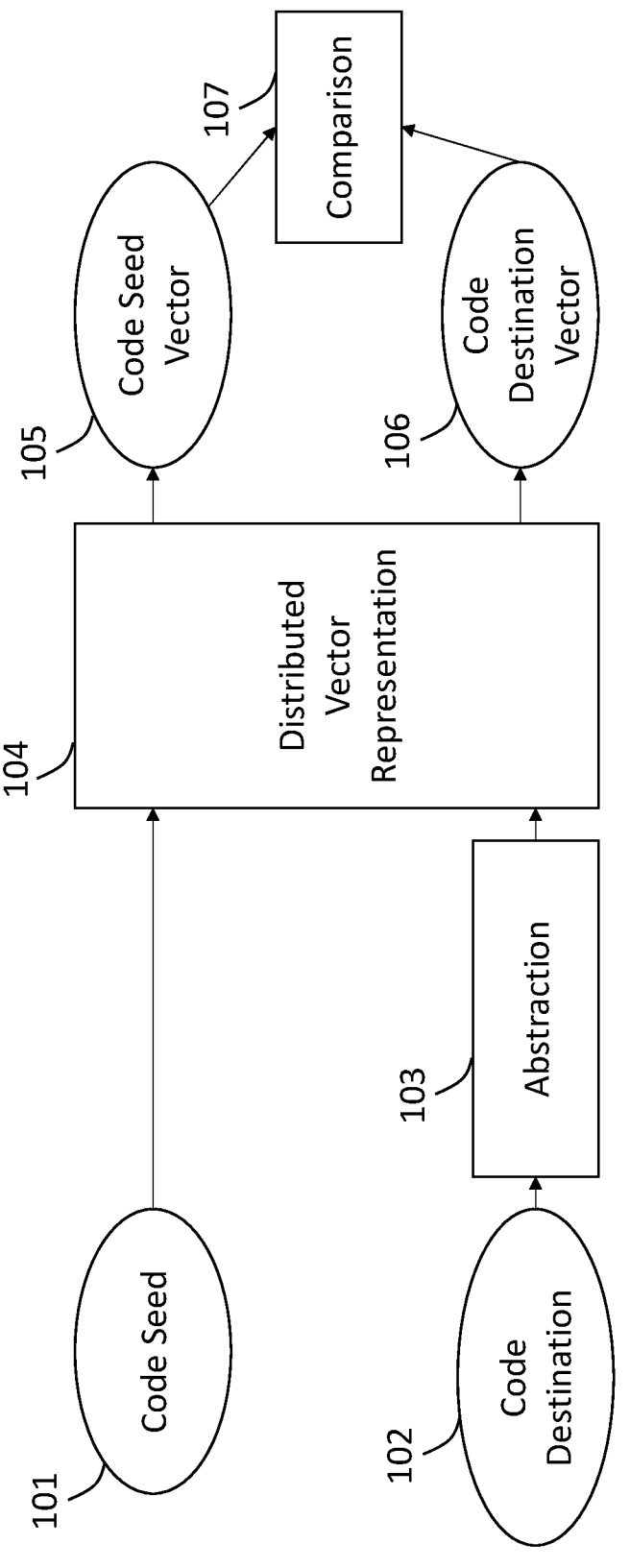
FIG. 1 is a flow diagram of a method according to at least one embodiment of the present disclosure.

The present disclosure is directed to a method for identifying clone code snippets. Clone code snippets are code snippets which have the same functionality, although they may look different from each other. This method is useful in identifying malicious code which has been obfuscated based on a known piece of malicious code.

For example, a malicious actor may wish to introduce malicious code into a piece of software. To the extent that the malicious code to be introduced is known and found in various malicious code databases, such malicious code could be easily identified and removed. However, by obfuscating the malicious code, the malicious actor may disguise the malicious code so that it is not recognized by traditional techniques.

The present disclosure provides methods to recognize obfuscated code, thereby facilitating recognition of malicious obfuscated code inserted into software. While the present disclosure will discuss such methods with reference to the JavaScript™, other programming languages are within the scope of the present disclosure.

In particular, the present disclosure aims to address three main problems for clone search.

Extremely Long Sequence: Either the source or the target of a code clone pair can be much longer than any typical neural sequence learning-based method can handle. With commonly available current hardware and model sizes, models such as Long Short Term Memory (LSTM) and Transformers typically limit the input sequence to 512 tokens.

Code Mixing: The malicious actor mixed the malicious seed code into a larger fragment of benign code or dead code. In these cases, the learning model needs to correlate two scripts and find common semantics in order to identify clones.

Code Obfuscation: After mixing, the code is typically packed or obfuscated, resulting in two pieces of code in a clone pair that provides very limited literal information for matching.

To address these challenges, there is provided a similarity learning-based model for efficient and effective clone search, which provides a robust solution against code-mixing and code obfuscation. Specifically, the present solution involves a code selection and abstraction layer for similarity learning. The code selection and abstraction layer, combined with a sequential encoder, is able to handle extremely long obfuscated code sequences.

Specifically, there is provided a code selection and abstraction layer for similarity learning. Combined with a sequential encoder, it is able to handle extremely long obfuscated code sequences. The code selection and abstraction process itself is not differentiable. Instead of using a typical gradient decent optimizer, the selection and abstraction process is used as a policy function that returns a feasible solution given the observed code. A reward function is used to train the policy function.

Therefore, the present disclosure aims to provide a method for identifying semantic clones for a given code snippet effectively from a large codebase. The present method is robust and capable of use in situations where the input snippet can be extremely long, the seed code is mixed with other code in the target snippet, and the seed scripts and the files in the search pool are obfuscated.

Specifically, there is provided a code selection and abstraction layer for similarity learning. Combined with a sequential encoder, it is able to handle extremely long obfuscated code sequences.

Existing Solutions

Generally, there are four recognized categories of clones:

Type 1: code fragments are syntactically identical except for spaces and tabs.

Type 2: in addition to Type 1 clone differences, identifier or function names are modified.

Type 3: in addition to Type 2 clone differences, syntactically similar code fragments differ at the statement level. Some common examples are if statements changed to switch statements or for loops changed to while loops. However, the code fragments are still similar in terms of structure or Abstract Syntax Tree (AST). Type 3 clones may be further subdivided based on level of similarity.

Type 4: usually completely dissimilar in syntax or even AST, but the code pairs have the same semantics.

Most existing clone search techniques focus on Type 3 clones where 70-90% of the tokens are similar to the original code. A few methods, such as in S. Ndichu, S. Kim, S. Ozawa, T. Misu, and K. Makishima. *A machine learning approach to detection of javascript-based attacks using ast features and paragraph vectors, Applied Soft Computing,* 84:105721, 2019, incorporated herein by reference, can accommodate all levels of code clones.

Clone search researches propose different techniques focusing on different granularity of code files, that are token-based, tree based (AST), data flow or control flow based, amongst others. A variety of techniques have been proposed, like hashing, indexing, vector representation, machine learning, or hybrid methods.

Most prior art clone search methods assume that entire code fragments are the clone of another, which is not applicable to some scenarios described above where the malicious seed is obfuscated into benign code. Besides, most clone search tools are designed for programming languages like C, C++ and Java, where the code files are easier to be broken into code fragments by functions, which is not realizable for script languages like JavaScript.

There are only a few studies focused on JavaScript code clones. For example, P. Likarish, E. Jung, and I. Jo. *Obfuscated malicious javascript detection using classification techniques,* 2009 *4th International Conference on Malicious and Unwanted Software (MALWARE),* pages 47-54. IEEE, 2009, and Ndichu et al., also work on an obfuscated malicious JavaScript dataset, but their experiments are about malicious file classification instead of clone search. They also use classic machine learning approaches like SVM and Doc2Vec.

Obfuscation Methods

Renaming is a common technique to rename the variables or methods in order to disguise the semantic meaning of the targets. Value transformation replaces the literals and numbers with hexadecimals.

Object key transformation is a special obfuscation for JavaScript involving renaming the keys in a JavaScript Object such that later reference to the object elements will use the renamed ones.

String splitting and rotation splits strings into different trunks, places the literals in an array, and further rotates the array.

Dead code injection injects a piece of non-functional code into the original JavaScript script.

Control flow flattening is a strong mean of obfuscation that increases the complexity of the original code by 5-fold. The flattening algorithm first breaks a code segment into different blocks. Then, these blocks are organized at the same level. For example, variable declarations are placed at the beginning and nested blocks are placed with the parent blocks. Each flattened block is regularized by a new state such that the order of execution of each block is controlled by these states. Furthermore, these regularized blocks are fitted into a pre-defined structure like a switch state, an if-else chain, or the like. Control flow flattening can greatly alter the structure of the original code such that the size of ASTs can grow between 150% to 300%.

Levels of Obfuscation

In literature, there is no widely accepted numeric scale for code obfuscation. C. Collberg, C. Thomborson, and D. Low, *A taxonomy of obfuscating transformations, Technical report, Citeseer,* 1997, incorporated herein by reference, defines three criteria to measure obfuscation, namely potency, resilience and cost.

Potency is a basic criterion for most obfuscations, and there is a trade-off between resilience and cost. More resilient obfuscations mostly have higher costs, like control flow flattening.

Following the approach defined by Deckard, the Levenshtein edit distance between the tokens and ASTs of two files denoted by $\|C-\tilde{C}\|_{ed}$ and $\|T-\tilde{T}\|_{ed}$ is calculated. The complexity level of an obfuscated file can be defined by the following two metrics:

$$O(C) = \frac{\|C - \tilde{C}\|_{ed}}{|C|} \qquad \text{(Equation 1)}$$

$$O(T) = \frac{\|T - \tilde{T}\|_{ed}}{|T|}$$

where $\mathcal{O}(x) \in$ $$\left[0; 1 + \frac{|\tilde{x}|}{x}\right]$$

and x is the tokens or AST of the input file. The complexity value indicates how many steps are required to update one set of tokens or AST to another in percentage of the number of tokens or nodes for the code fragment. To instantiate, if $\mathcal{O}(C)=0.9$, it means 10% of the tokens persist in the obfuscated file (with same order). If $\mathcal{O}(T)=1.2$, it means all of the nodes in the original AST are required to be updated or removed and another 20% of nodes are added.

Neural Sequence Learning Model

Neural sequence models are the neural networks for modeling sequential data, such as a sentence. Typical sequence models such as recurrent neural networks (RNNs)-based models have achieved great success in many natural language processing (NLP) applications as they can learn a distributed vector representation of text, e.g., a sentence. Sequence-to-sequence (Seq2seq) models are another type of sequence model that take sequential data as input and generate sequential data as output, and is widely used in tasks like machine translation, text summarization, and text generation. Besides being applied on text, sequence models have also been applied to model source code.

RNN-based models have several drawbacks. First, the predicted output has fixed length. Second, the models are trained only on the distribution of training data, which is named as exposure bias. Third, the loss function does not conform to the benchmark metric like BLEU. Also, such metrics are not continuous, thus, not differentiable. Fourth, if the sequential data is long, the RNN model is often hard to converge since distant units can easily been forgotten as the chain of hidden stats gets longer.

Recently, reinforcement learning concepts have been brought to NLP research as the language modeling for text generation can be considered a Markov decision process to pick lexical tokens, which may be optimized by policy gradient methods.

Problem Definition

The present disclosure aims to provide a method for identifying semantic clones for a given code snippet (i.e., seed script) effectively from a large codebase. The solution described herein is robust and capable of use in situations where the input snippet can be extremely long, the seed code is mixed with other code in the target snippet, and the seed scripts and the files in the search pool are possibly obfuscated.

As most prior art methods assume that clone pairs have the same semantics, four new obfuscation methods are considered:

M1: The seed file has been injected into the base file without any modification such that $C_{dest}=C_{seed} \oplus C_{base}$;

M2: The destination file is an obfuscated version of the seed file such that $C_{dest}=\tilde{C}_{seed}$;

M3: The obfuscated seed file has been injected into the base file such that $C_{dest}=\tilde{C}_{seed} \oplus C_{base}$;

M4: The seed file has been injected into the base file and the whole crafted file has been obfuscated as the destination file such that $C_{dest}=f_{obs}(C_{seed} \oplus C_{base})$, and in some cases, the crafted file can be mixed with dead code that has no functionality, such that $C_{dest}=f_{obs}(C_{seed} \oplus C_{base}) \oplus C_{dead}$.

In the above, the $\oplus$ operator is used to indicate not only concatenation or injection, but also scattering of the seed file in the destination file.

For M1, a simple text search is sufficient to identify clones. Most prior art methods have focused on M2 and M3 with Type 2 and Type 3 clone seeds, such as in Deckard which segments the code file into functions or small pieces. However, M3 and M4 are the most common use cases.

As it is not ideal to divide a script file into segments of functions, the present disclosure provides solution for M4 with Type 3 and Type 4 clones as it will also cover all other scenarios under consideration. Although M4 with dead code is not a general case in the real-world, it is used to show that long sequences can be handled.

Generally, a code snippet C can be written as a sequence of ordered lexical tokens, such that $C=\{x_0, x_1, \ldots, x_n\}$ for $x_i \in \Gamma$, where $\Gamma$ is a set of all tokens for a programming language.

A snippet C can be obfuscated by an obfuscation function $f_{obf}$, such that $C'=f_{obs}(C)$, where C' represents an obfuscated version of C. C and C' function semantically the same, but with a different set of tokens, such that $\|C'-C\|>0$.

A clone search function is defined as:

$$f_{cs}(C_{seed}, C_{dest})=\delta(\phi(C_{seed}),\phi(\pi(C_{dest}))) \qquad \text{(Equation 2)}$$

Where $C_{seed}$ represents a known code snippet and $C_{dest}$ is unknown, $\delta$ represents a comparison function that takes in as input vector representations of the code snippets, $\phi$ is a function that transforms a code snippet into a vector representation, and $\pi$ is a function that abstracts the functionality of a large code snippet. This equation is illustrated with respect to FIG. 1.

As shown in FIG. 1, code seed 101 is transformed in a vector representation at block 104, to produce code seed vector 105. Code destination 102 is first abstracted at block 103, and then transformed in a vector representation at block 104, to produce code destination vector 106. Code seed vector 105 and code destination vector 106 are then compared at block 107.

The output of the comparison at block 107 is binary. Specifically, the output of the comparison is 1 if and only if $C_{dest}$ has a subset of tokens $[x_m; x_{m+1}, \ldots x_{m+k}]$ that is semantically identical with $C_{seed}$. Otherwise, the output of the comparison is 0.

Main Structure

To address the above issues, there is provided a neural network model to encode the input sequence into a fixed length characteristic vector and compare the vectors generated from seed and destination files. Furthermore, the model uses a reinforcement learning approach to abstract tokens from long sequence destination data to be compared with the seed file. In brief, the encoder model reduces the sequence of input tokens $[x_0; x_1; \ldots x_n]$ into a vector representation $\vec{v}=[v_0; v_1; \ldots v_m]$. Then, the model calculates the cosine similarity between $\vec{v}_{seed}$ and $\vec{v}_{dest}$ as an evaluation score for clone search. Additionally, if the sequence is too long, we use abstraction, which is a reinforcement learning approach to select tokens that can represent the general semantics of the whole sequence such that we can further shorten the input length.

The general architecture is a Siamese model that generates the semantic similarity score of input pairs. The abstraction process takes embedded vector as inputs, generates the probability as the policy, selects tokens based on the policy, and outputs the concatenated sequence. The final reward is achieved by the similarity score and the loss is conditioned under reward and joint probabilities.

The abstraction process is designed to address the problems of long sequences and code mixing. The abstraction disentangling regularization further mitigates problems due to long sequences. Finally, the sequence encoder uses a deep neural network to de-obfuscate the inputs.

Input Preprocessing and Embedding

Figure 2:
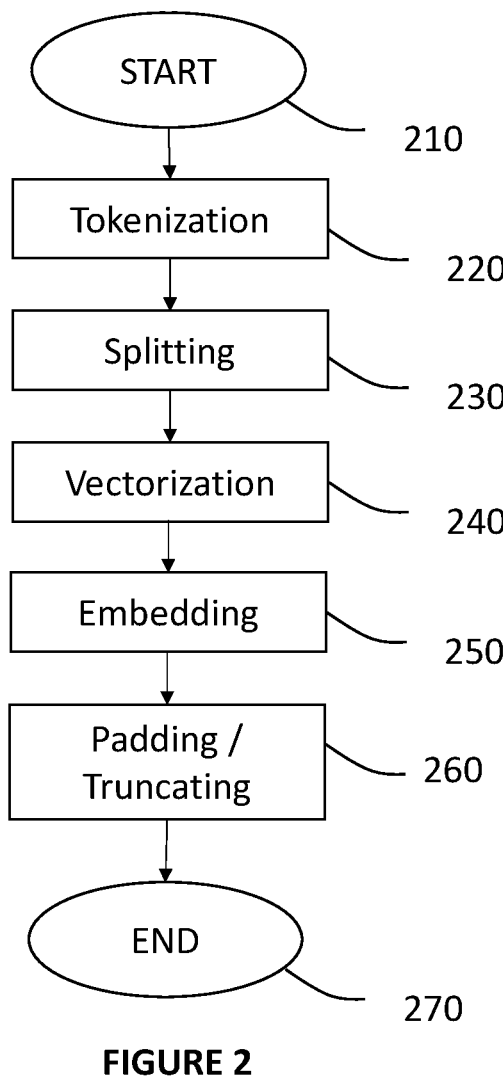
FIG. 2 is a flow diagram for transforming code snippets into vectors according to at least one embodiment of the present disclosure.

Reference is now made to FIG. 2, which illustrates the process for transforming a code snippet into a vector representation. The process starts at block 210 and proceeds to block 220 in which the code snippet is tokenized.

Tokenization removes irrelevant elements from the code and splits the code into separate tokens. The tokenizer traverses through the entire code snippet and preserves all keywords, literals, and variables and removes noise like comments. For example, the following code snippet:

$.ajax({"url":"SomeUrl",})//ajax call would be transformed, after tokenization, into the following:

$.ajax({url:SomeUrl,})

The process then moves on to block 230 in which the tokenized code snippet is split into separate tokens.

The process then moves to block 240 for the vectorization step in which the tokens are mapped to a numerical value. For example, the above code snippet could be mapped to:

1234567-1854

Where "$" is mapped to 1, "." Is mapped to 2, "ajax" is mapped to 3, "(" and ")" are mapped to 4, "{" and "}" are mapped to 5, "url" is mapped to 6, ":" is mapped to 7, "SomeUrl" is mapped to –1, and "," is mapped to 8.

Vectorization may utilize a dictionary which contains the mapping for keywords and other commonly used words. Words for which the dictionary contains no entry are mapped to –1, as in the case of "SomeUrl" above.

The process then proceeds to block 250 for embedding, where the numerical values are mapped to vectors. For example, the above code snippet would be transformed, during the embedding step, into the following, where each numerical value is mapped to a corresponding vector.

$$V_1V_2V_3V_4V_5V_6V_7V_{-1}V_8V_5V_4$$

The embedding step 250 is performed by an embedding layer, which is trained with a training data set prior to operation. During training, each corresponding vector is refined to indicate the semantic relationship between each word. For regular languages, the use of semantic relationships greatly improve performance. For example, in the JavaScript programming language, the token var is followed by a name token to indicate that a new variable is being instantiated.

According to at least one embodiment, the length of these numerical vectors is 6 k, however, the present disclosure is not so limited. Therefore, after embedding, the vector is padded or truncated at block 260 to achieve the desired length. For the above example, the resulting vector would be as shown below:

$$V_1V_2V_3V_4V_5V_6V_7V_{-1}V_8V_5V_40000000[ \ldots ]0$$

The process then proceeds to block 270 and ends.

Abstraction

Abstraction is a widely adopted design pattern for programming languages. When programmers write more and more duplicated code, they tend to abstract the repetitive patterns into a single base class or template. Recurrent Neural Networks (RNNs) may suffer from vanishing gradient for long sequence data, which leads to a poor performance to extract the context meaning from obfuscated content. According to at least one embodiment of the present disclosure, the following abstraction process is used to reduce the size of inputs.

Generally, the abstraction process traverses the entire code fragment and calculates the probability for each token if it can represent the semantics of latter sequence. Based on the probability, the entire code is truncated into different pieces. All pieces are then gathered together to generate a new abstraction.

Tunable parameters are used in the abstraction process. Specifically, when dividing a large code segment (as represented by a series of vectors, as discussed above), the abstraction process will produce a number of trunks (i.e., subsegments of the code segment), each having a predetermined length len. The number of trunks will be equal to a number of filters of the model, t. For example, a code segment having 1000 tokens may be abstracted into 10 trunks of length 20, which are then recombined into a code segment of length 200. Through experimentation, it has been found that the number of filters may be set to between 4 and 8, and the length may be set to 256 or 512, in order to achieve good results, depending on the length of the code segment being abstracted.

Figure 3:
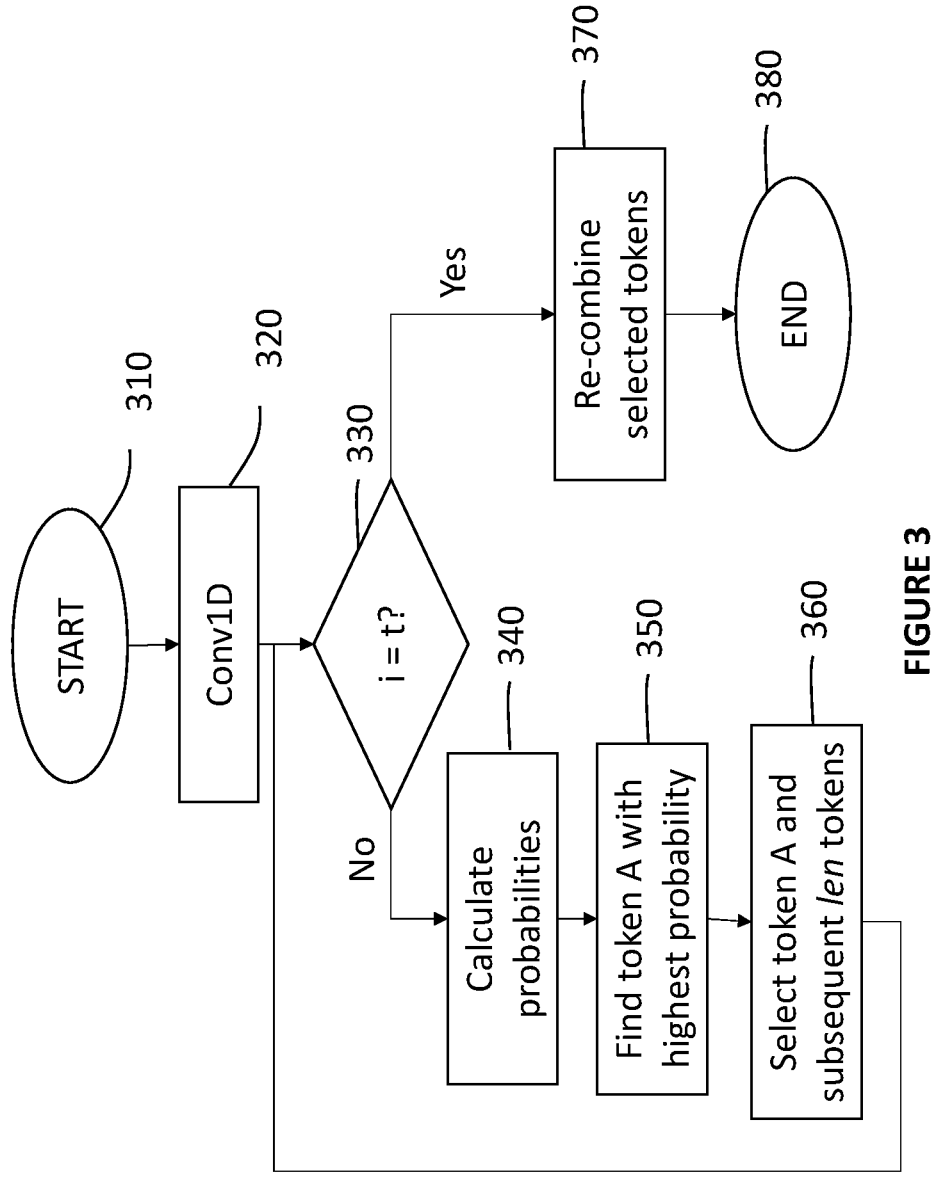
FIG. 3 is a flow diagram for abstracting a code segment into a shorter code segment according to at least one embodiment of the present disclosure.

Such a process is illustrated with respect to FIG. 3. Specifically, in FIG. 3, the process starts at block 310 and proceeds to block 320, in which a one-dimensional convolutional neural network is used to generate logits for each token in the text sequence. Notably, the input for this step are the embedded vectors such that the one-dimensional convolutional neural network can benefit from the spatial information embedded in the higher dimensions. This step generates a logit for each token of the original code segment.

The process then proceeds to block 330 to iterate t times. From block 330, if the number of iterations is less than t, the process moves on to block 340, where a probability is calculated for each token of the subsegment. According to at least one embodiment of the present disclosure, this step may be performed by the function softmax.

Figure 4:
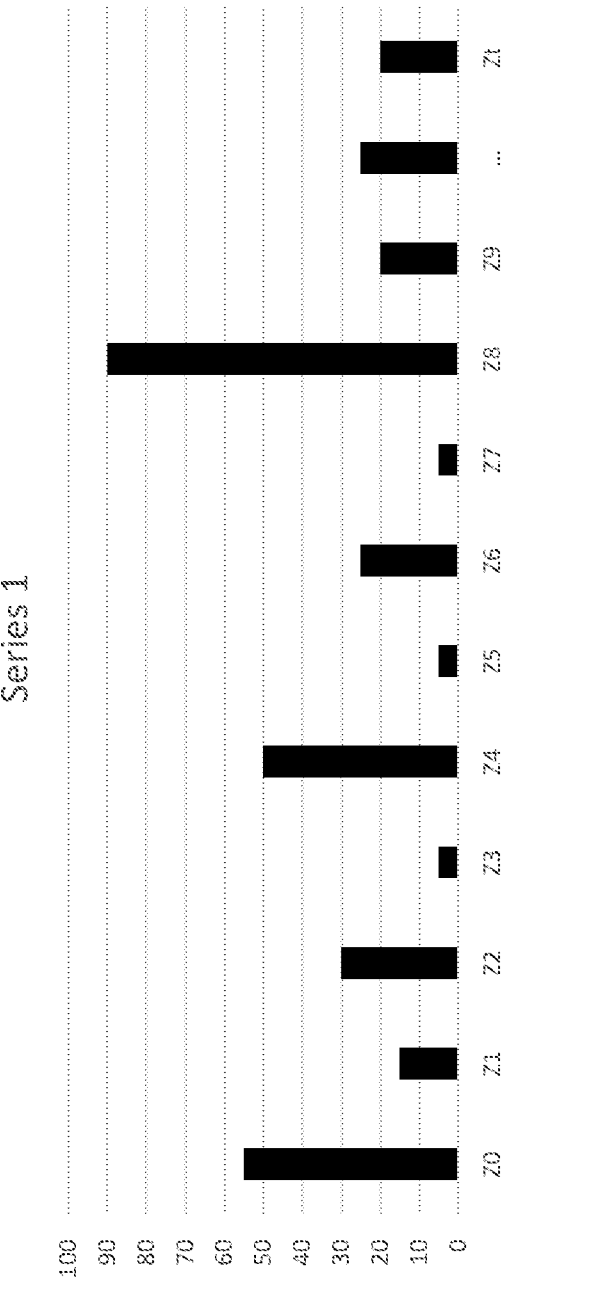
FIG. 4 is a graphical representation of probabilities for each token as calculated during the abstraction process, according to at least one embodiment of the present disclosure.

The output of block 340 is illustrated with respect to FIG. 4. As seen in FIG. 4, for each token $z_0, \ldots, z_t$, there is a probability (i.e., a number between 0 and 1, or 0 and 100). In the example of FIG. 4, the highest probability is found for vector $z_8$.

The process then proceeds to block 350, where the token with the highest probability is selected. Specifically, at the i-th iteration, the token with the i-th highest probability is selected. A new trunk is then constructed at block 360, starting with the token selected at step 350 followed by the len subsequent tokens. This produces a trunk of length len+1.

The process then returns to block 330 for the next iteration. If all iterations have been performed, the process proceeds from block 340 to block 370, where all trunks are combined. The process then proceeds to block 380 and ends.

Convolutional neural networks are scalable to the size of the data and each filter can be computed in parallel, thereby providing a solution to the long sequence problem.

The abstraction algorithm illustrated in FIG. 3 may also be expressed as follows:

```
Function πθ(C)
    logits_t ← Conv1D(C)
    for i = 1 to t, do
        probs ← softmax(logits_i)
        P_i ← max(probs)
        a ← argmax(probs)
        T_i ← C[a: a + len]
    end for
    T ← gather all T_i
    return T, P_t
```

Abstraction Policy Gradient

The present disclosure provides for an encoder model using recurrent neural networks (RNNs) and the comparison of encoded vectors with cosine similarity. Moreover, clone search tools also need to search pairs efficiently. While the seed tokens can be randomly distributed among the destination tokens, it is not feasible to partition the script files into different pieces. So, the need arises to scan every trunk of the destination tokens, and predict the distribution of seed tokens.

This problem can be assimilated to a classic probability problem: assuming there is bag containing three balls, and that each ball can be either yellow or red. If a ball is selected one at a time, how many of them are red and how many of them are yellow? To answer this question, the maximum likelihood estimation (MLE), defined by equation 2 below, may be used:

$$\mathcal{L}(x) = \prod_{i=1}^{n} \pi\ (x_i) \qquad \text{(Equation 3)}$$

A single code segment is represented as a set of n ordered code pieces $C=\{x_0, x_1, \ldots, x_n\}$. In order to estimate a true probability distribution $\pi(C)$, according to at least one embodiment of the present disclosure, there is provided a parametric function approximation $\pi_\theta(C_{dest})$ to extract tokens from $C_{dest}$, where the parameters $\theta$ can best approximate the probability of the observed data. Therefore, $\theta$ should be over the same space with $C_{dest}$. The maximum likelihood is the product of $\pi_\theta(x)$ to represent the joint probability. However, in order to avoid numeric overflow or vanishing, which also makes it difficult for deep neural networks to converge, we use the sum of log probabilities. Also, maximizing log likelihood is equivalently minimizing cross entropy or KL divergence.

Assuming $C_{dest}$ is the crafted destination code piece, $C_{seed}$ is the seed tokens and $T=\{t_1, t_2, \ldots, t_k\}$ is the abstracted tokens, we then have the following conditioned MLE:

$$\mathcal{L}_\theta = \prod_{i=1}^{k} \log \pi_\theta\ (t_i \mid t_{i-1}, C_{seed}, \theta) \qquad \text{(Equation 4)}$$

The objective during training of a neural network is to maximize the rewards received from the neural network's computations. This may be achieved based on a loss function, where maximizing the rewards corresponds to minimizing the loss function. According to at least one embodiment of the present disclosure, the loss function and the derivative of the loss function are as follows:

$$\mathcal{L}_\theta = -\mathbb{E}_{t_1 \ldots t_k \sim \pi_\theta}[r(T)]$$

$$\nabla\mathcal{O}_\theta = -\mathbb{E}_{t_1 \ldots t_k \sim \pi_\theta}[\nabla \log \pi_\theta(t_1, \ldots, t_k) r(T)] \qquad \text{(Equation 5)}$$

where $\mathbb{E}$ represents the expected value, $t_i$ is the abstracted trunks and r(T) is a single reward received by comparing the abstracted tokens with the seed tokens.

Figure 5:
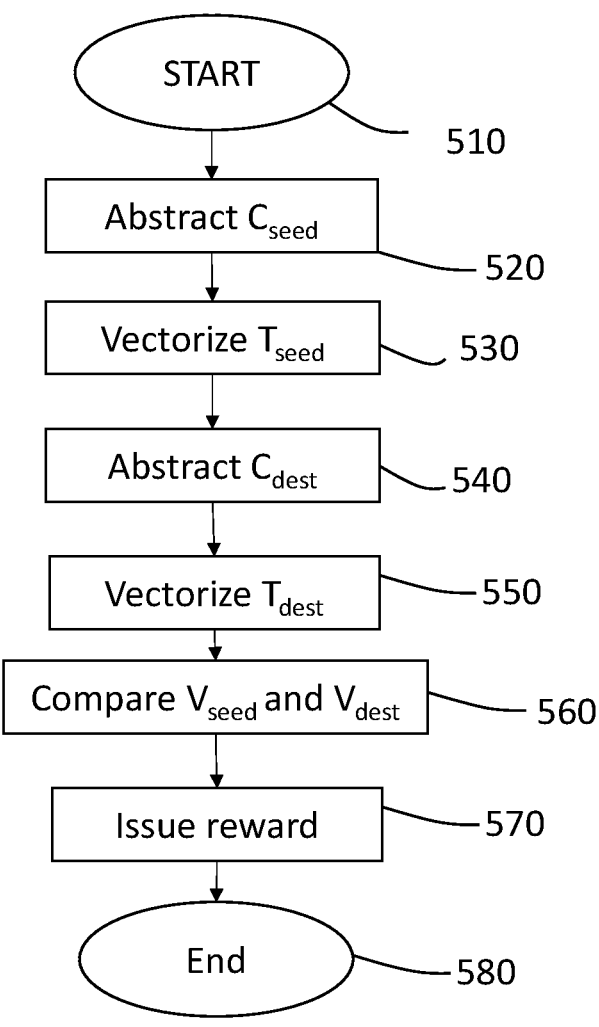
FIG. 5 is a flow diagram illustrating a method of training the abstraction layer, according to at least one embodiment of the present disclosure.

Reference is now made to FIG. 5, which illustrates a training process for the abstraction model based on the above. The process of FIG. 5 may be performed until convergence—that is until the loss function is minimized, with a plurality of training data files.

For each set of training data files, there is a $C_{seed}$ and a $C_{dest}$, corresponding to the seed code segment and the destination code segment, respectively.

The process starts at block 510 and proceeds to block 520 where $C_{seed}$ is abstracted according to the process described above with respect to FIG. 3. This produces abstracted code segment $T_{seed}$.

The process then proceeds to block 530 where $T_{seed}$ is vectorized to produce vector $V_{seed}$. This is performed based on an encoder which is already trained.

The process then proceeds to block 540 where $C_{dest}$ is abstracted using the process described above with respect to FIG. 3. This produces abstracted code segment $T_{dest}$.

The process then proceeds to block 550 where $T_{dest}$ is vectorized to produce vector $V_{dest}$. This is performed based on an encoder which is already trained.

Then, at block 560, $V_{seed}$ and $V_{dest}$ are compared using cosine similarity. As this is training data, it is known whether $C_{seed}$ and $C_{dest}$ are clones or not. If the process produced the right answer—that is if $V_{seed}$ and $V_{dest}$ are found to be a match when they are in fact a match, a reward is issued at block 570. Otherwise, if the process produced the wrong answer, a penalty (i.e., a negative reward) is applied at block 570.

The process then ends at block 580.

This method of training the one-dimensional convolutional neural network is useful in that it can handle discrete sequences, whereas other deep learning models would fail to converge from discrete sequences.

Based on the reward, the maximum likelihood probability is calculated as the loss for the abstraction model. As the values are discrete, the expectation is the sum of the log probabilities multiplied by rewards.

In summary, the abstraction algorithm extracts tokens from an obfuscated destination file by the policy for each token. Then the training algorithm assigns rewards based on cosine similarity scores between the abstractions and seed tokens. Then, the policy is updated by equation 4.

Abstraction Disentangling

Since no greedy policy is used in the abstraction training method described above with respect to FIG. 5, the abstraction model can be easily overfitted. For example, if there exists a common pattern for the obfuscated seed, all filters can be centralized to that pattern of code trunk. To further normalize the generated distributions, we use the Kullback-Leibler divergence to compare the probability for each filter. The Kullback-Leibler divergence is discussed in T. Van Erven and P. Harremos. *Renyi divergence and kullback-leibler divergence, IEEE Transactions on Information Theory*, 60(7):3797-3820, 2014, incorporated herein by reference.

This process ensures that the abstraction process selects code trunks that are distributed across the code segment. The following equation may be used:

$$kl(p_1, p_2) = - \sum_{x \in X} p_1(x) \log \frac{p_1(x)}{p_2(x)} \qquad \text{(Equation 6)}$$

where $p_1$ and $p_2$ represent a statistical distribution for two filters, as computed in step 340 of FIG. 3.

The negative Kullback-Leibler divergence is used in order to provide more balanced distributions of code trunks from a code segment, instead of having many code trunks selected from the same section of the code segment.

Figure 6:
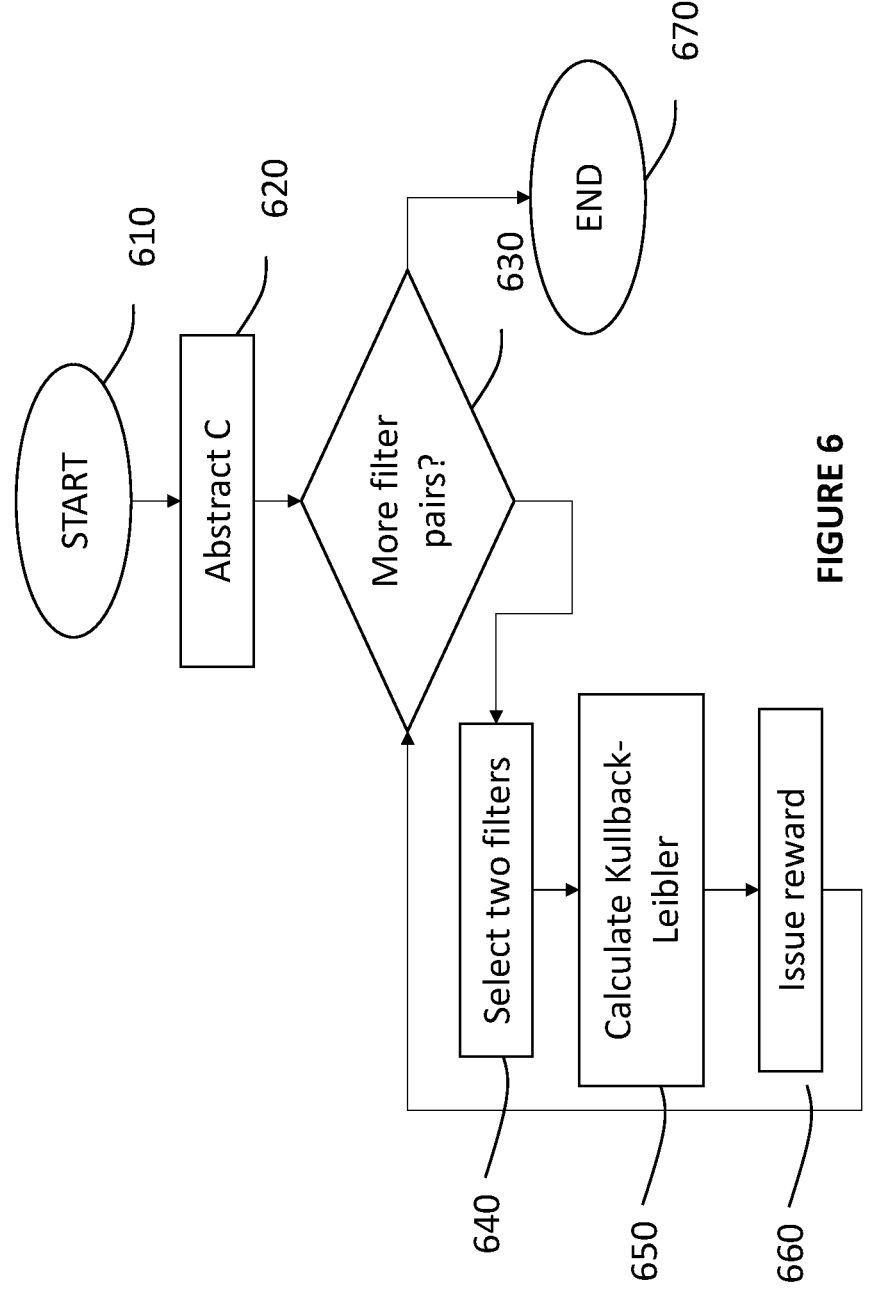
FIG. 6 is a flow diagram illustrating a method of refining the abstraction model, according to at least one embodiment of the present disclosure.

Therefore, according to at least some embodiments of the present disclosure, the abstraction model is further refined based on the method illustrated in FIG. 6.

As seen in FIG. 6, the process starts at block 610 and proceeds to block 620 where a code segment is abstracted using a trained abstraction model. According to at least some embodiments, the abstraction model is trained using the method of FIG. 5. Moreover, according to at least some embodiments, the code segment is abstracted using the method illustrated in FIG. 3.

The process then proceeds to block 630 where each non-identical pair of filters from the set of filters used in the abstraction model is iterated through. At block 640, two non-identical filters from the abstraction model are selected. The process then proceeds to block 650 where the Kullback-Leibler divergence is calculated. According to at least some embodiments, this is performed according to Equation 6, above.

As seen with respect to FIG. 3, step 340 involves the calculation of probabilities. These probability distributions are fed into Equation 6 as $p_1$ and $p_2$, corresponding to each of the two selected filters.

The process then proceeds to block 660 where a reward is issued based on the Kullback-Leibler divergence. The reward may be based on a loss function, where a minimized loss is considered equivalent to a maximized reward.

The reward is then used to adjust the abstraction model to provide a more balanced distribution of code trunks from the code segment.

Encoder

The encoder serializes the code tokens into a fixed length feature vector with fewer dimension than the number of tokens or nodes of an Abstract Syntax Tree (AST). The encoder model of the present disclosure contains two or more RNN layers and one or more fully connected feed-forward layers. RNNs can carry forward previous context meanings into later states, which is beneficial for the model since the intent of the code is only expressive with the whole context and obfuscation can further alter the structure of the original code. Each hidden RNN layer is also bidirectional, that concatenates the forward and backward states for each timestamp. The RNN layers are replaced with the attention encoder as a baseline to be compared with. The last layer is a fully connected layer that maps the hidden states to the final vector.

Figure 7:
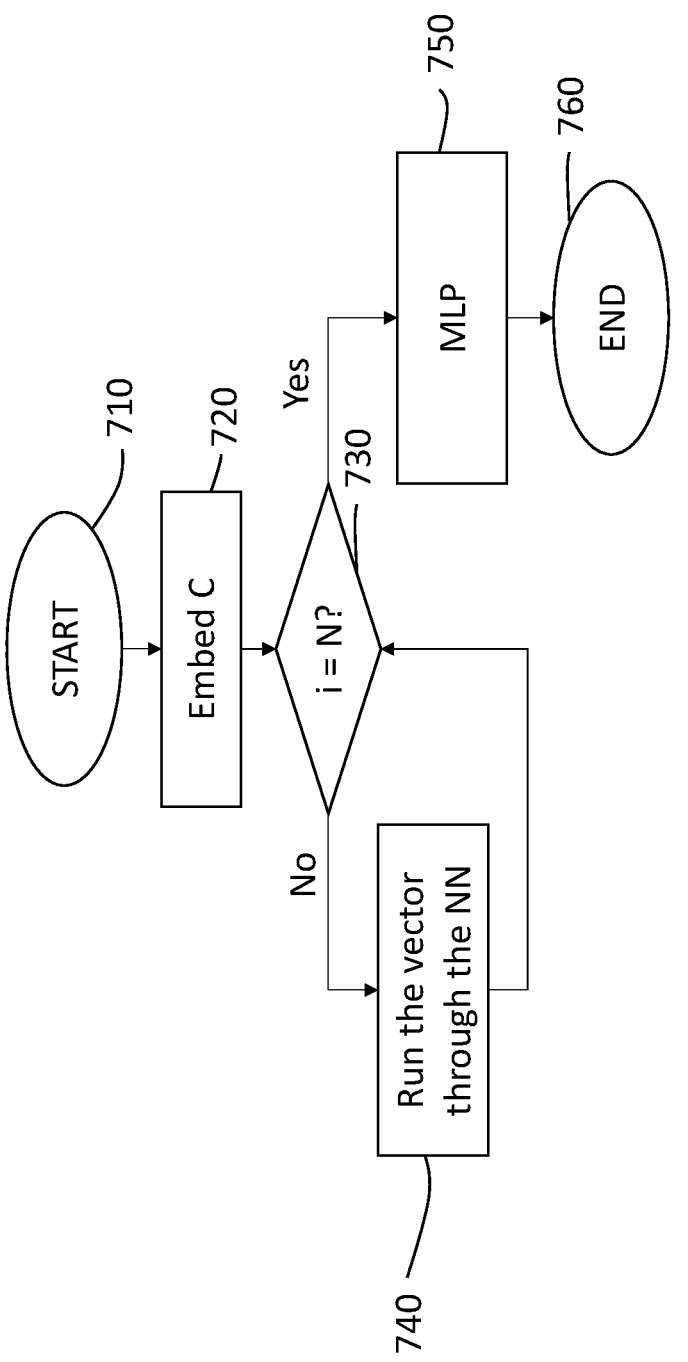
FIG. 7 is a flow diagram illustrating a method of encoding code segments into vectors according to at least one embodiment of the present disclosure.

Reference is now made to FIG. 7, which illustrates a method for encoding a code segment according to at least one embodiment of the present disclosure. The parameters of the method include a number of hidden layers N for the bidirectional neural network, an embedding dimension, and a number of cells for the neural network.

The process starts at block 710 and proceeds to block 720 where a code segment is embedded to produce a vector. The process then proceeds to block 730 to iterate through N times, once for each hidden layer.

At block 740, the vector is processed through the neural network. Notably, the vector is updated at each iteration such that the first iteration, the vector produced at block 720 is used, and thereafter each subsequent iteration the vector produced by the previous iteration is used.

Once the vector has been run through the bidirectional neural network N times, all the vectors from each iteration are combined through a Multi-Layer Perceptron (MLP) to produce the final vector, at block 750. The process then ends at block 760.

Although the transformer architecture is commonly used for better performance, in this application only the encoder portion of the transformer architecture is needed to encode the script into a representative vector such that it can be searched by existing algorithms. Using the encoder and decoder architecture for comparing m seed files and n obfuscated files would take O(mnt), where t is the operation for the transformer neural network.

Similarities Learning

Once the lexical tokens are transformed to characteristic vectors, the cosine similarities between different vectors can be calculated. According to at least some embodiments of the present disclosure, this calculation is based on the following equation:

$$\cos\_\text{sim}_{(\vec{v}_{seed}, \vec{v}_{dest})} = \frac{\vec{v}_{seed} \cdot \vec{v}_{dest}}{\|\vec{v}_{seed}\| \cdot \|\vec{v}_{dest}\|} \qquad \text{(Equation 7)}$$

One advantage that cosine similarity provides over Euclidean distance is that the value of cosine similarity is within a range of [−1; 1], and continuous everywhere such that the machine learning model can easily calculate loss with the labels. The training process for the encoder model is described with respect to FIG. 8. The cosine similarity is scaled to a range of [0; 1] for consistency with the labels. The binary cross entropy is used as the loss function for gradient descent.

Figure 8:
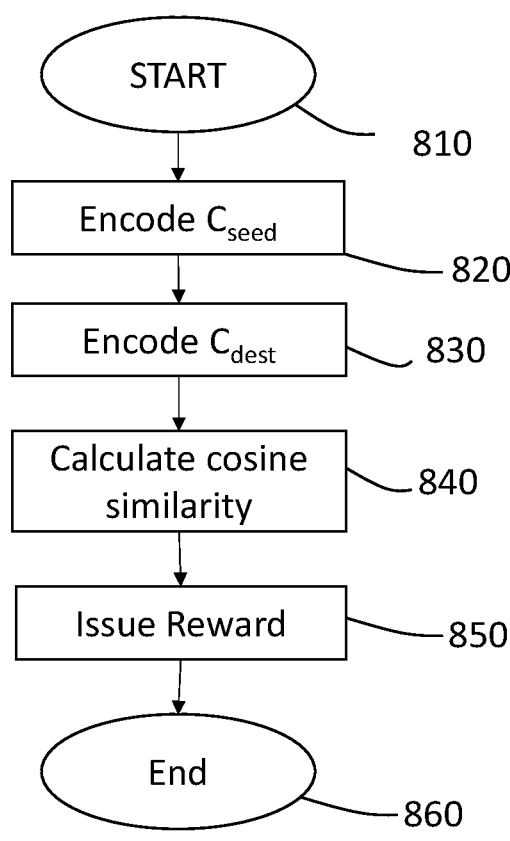
FIG. 8 is a flow diagram illustrating a method of training the encoder model according to at least one embodiment of the present disclosure.

The process of FIG. 8 is fed with training data, comprising a plurality of seed files, a plurality of destination files, and data indicating whether any two files are clones of each other or not. Each time the process of FIG. 8 is performed, a selected destination file and a selected seed file, and the knowledge of whether this pair of files are clones, are provided as inputs.

The process of FIG. 8 starts at block 810 and proceeds to block 820 where the destination file is encoded using the encoder in training. The process then proceeds to block 830 where the seed file is encoded using the encoder in training.

According to at least some embodiments, the encoder in blocks 820 and 830 uses a method according to FIG. 7, described above.

The process then proceeds to block 840 where the cosine similarity between the vectors encoded in blocks 820 and 830 is calculated. According to at least some embodiments, the cosine similarity is encoded according to Equation 7, above.

The cosine similarity is then used to issue a reward at block 850 and the process ends at block 860. The reward may be based on a loss function, for example the binary cross entropy may be used as a loss function. To compute the binary cross entropy, the cosine similarity is scaled to a range of [0; 1] based on the following formula:

$$y_{scaled} = \frac{y+1}{2} \qquad \text{(Equation 8)}$$

where y is the cosine similarity having a range of [−1; 1], and $y_{scaled}$ is the scaled cosine similarity having a range of [0; 1]. The binary cross entropy may then be computed using the following equation:

$$\mathbb{E} = -(\hat{y} \log y + (1-\hat{y})\log y) \qquad \text{(Equation 9)}$$

where $\hat{y}$ represents the known relationship between the two files, and y is the scaled cosine similarity.

The encoder is then updated according to the loss function, and the process of FIG. 8 may be repeated with different input files until the encoder converges.

Identifying Malicious Software

Figure 9:
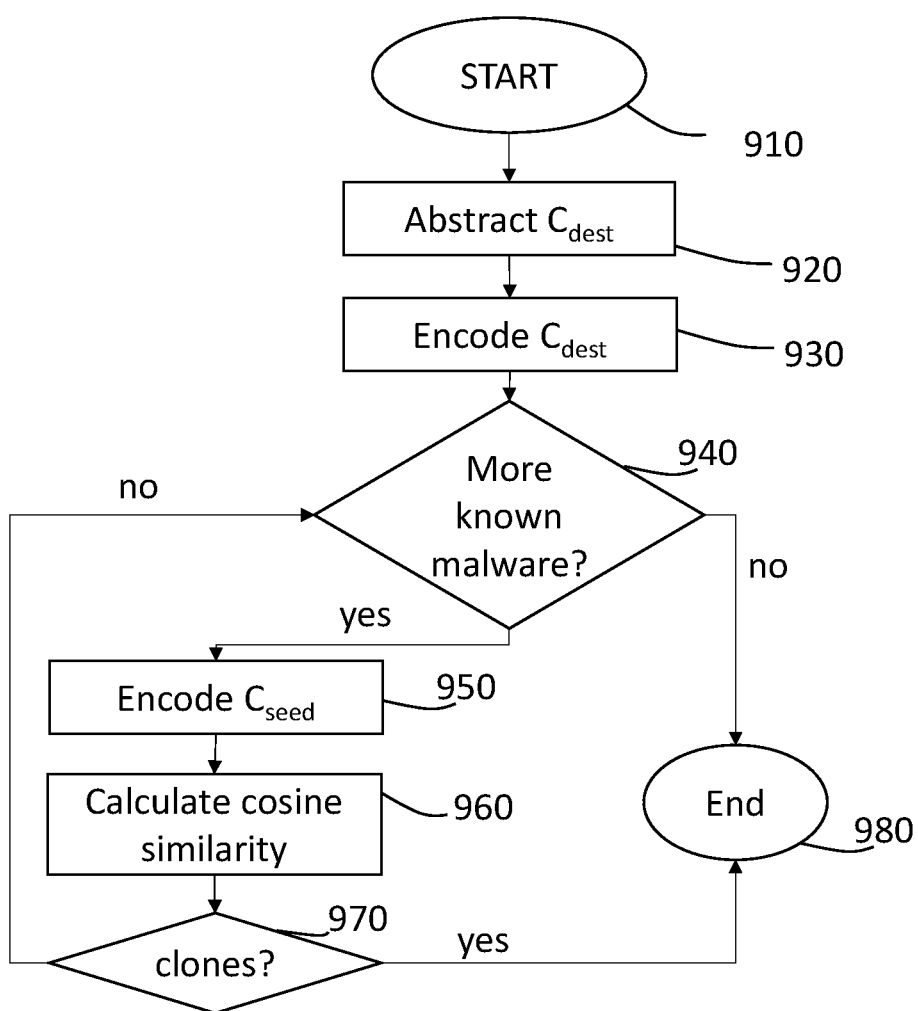
FIG. 9 is a flow diagram of a process for identifying malicious code files according to at least one embodiment of the present disclosure.

According to at least some embodiments of the present disclosure, there is provided a method for identifying malicious software, as illustrated with respect to FIG. 9. According to at least some embodiments, the encoder used in the method of FIG. 9 operates according to the method of FIG. 7 discussed above, and has been trained according to the method of FIG. 8, discussed above. A database comprising known malicious software files is used to test a new software file. Known malicious software files are identified as $C_{seed}$, and the new software file is identified as $C_{dest}$.

The process starts at block 910 and proceeds to block 920 where $C_{dest}$ is abstracted. As discussed above, the abstraction process is used to reduce the size of the destination file to a size that can be handled properly by the encoder. Therefore, according to some embodiments, this step may be skipped if the size of the destination file is below a threshold.

According to at least some embodiments, the abstraction model used operates according to FIG. 3 discussed above, and has been trained according to FIG. 5 discussed above. Moreover, in at least some embodiments, the abstraction model has been refined according to FIG. 6 discussed above.

The process then proceeds to block 930 where the destination file is encoded into a vector. According to at least some embodiments, the encoder used operates according to FIG. 7 discussed above and has been trained according FIG. 8 discussed above.

The process then proceeds to block 940 where a known malware file is selected from a database of known malware files. The process then proceeds to block 950 where the known malware file is encoded into a vector, using the same encoder as in block 930.

The process then proceeds to block 960 where the cosine similarity of the vector for the destination file and the vector for the known malware file is computed. Then, based on the computed cosine similarity, it is determined whether the destination file is a clone of the known malware file or not. According to at least some embodiments, the cosine similarity is compared to a threshold value to determine whether the destination file is a clone of the known malware file.

If the two files are clones, the process ends at block 980. An action may be taken with respect to the destination file identified as a clone of a known malware file. For example, the destination file may be discarded, or tagged as malicious software.

If the two files are not clones, the process is repeated starting at block 940. If all known malicious software files have been compared to the destination file, the process ends at block 980. In this case, none of the known malicious software files were found to be a clone of the destination file. An action may be taken with respect to the destination file for which no clone was found. For example, the destination file may be added to a whitelist, or tagged as safe to use. In at least some embodiments, the destination file is added to a software project.

Example Hardware

The above functionality may be implemented on any one or combination of computing devices. FIG. 10 is a block diagram of a computing device 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, etc. The computing device 1000 may comprise a central processing unit (CPU) 1010, memory 1020, a mass storage device 1040, and peripherals 1030. Peripherals 1030 may comprise, amongst others one or more input/output devices, such as a speaker, microphone, mouse, touchscreen, keypad, keyboard, printer, display, network interfaces, and the like. Communications between CPU 1010, memory 1020, mass storage device 1040, and peripherals 1030 may occur through one or more buses 1050.

The bus 1050 may be one or more of any type of several bus architectures including a memory bus or memory controller, a peripheral bus, video bus, or the like. The CPU 1010 may comprise any type of electronic data processor. The memory 1020 may comprise any type of system memory such as static random-access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1040 may comprise any type of storage device configured to store data, programs, and other information and to make the data, programs, and other information accessible via the bus. The mass storage device 1040 may comprise, for example, one or more of a solid-state drive, hard disk drive, a magnetic disk drive, an optical disk drive, or the like.

The computing device 1000 may also include one or more network interfaces (not shown), which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network, for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Experiments

To test the above, a new test dataset was generated by collecting JavaScript files from open-source repositories, including a baseline that is commonly used in literature to support long sequence data. Details of the experiments and results are provided in Appendix A: Leo Song, Steven Ding, Yuan Tian, Li Tao Li, Weihan Ou, Philippe Charland, Andrew Walenstein, *Cybertron: Towards a Robust JavaScript Clone Search System against Code Obfuscation through Reinforcement Subsequence Learning*.

The invention claimed is:

1. A method at a computing device for identifying malicious software, comprising:
  a) encoding a first software file using an encoder model to create a first encoded vector;
  b) selecting a malware file from a database of malware files;
  c) encoding the malware file using the encoder model to create a second encoded vector;
  d) computing a cosine similarity between the first encoded vector and the second encoded vector; and
  e) determining whether the first software file is a clone of the malware file based on the cosine similarity;
  wherein the encoder model is trained with training data, the training data comprising a plurality of destination files, a plurality of seed files, and indications of which of the destination files are clones of which of the plurality of seed files.

2. The method of claim 1, further comprising: repeating steps b), c), d), and e), with each file from the database.

3. The method of claim 2, further comprising: when none of the malware files from the database are determined to be the clone of the first software file, tagging the first software file as safe.

4. The method of claim 2, further comprising: when at least one of the malware files from the database is determined to be the clone of the first software file, tagging the first software file as unsafe.

5. The method of claim 1, wherein the cosine similarity is computed based on $$\cos\_sim_{(\vec{v}_{seed}, \vec{v}_{dest})} = \frac{\vec{v}_{seed} \cdot \vec{v}_{dest}}{\|\vec{v}_{seed}\| \cdot \|\vec{v}_{dest}\|}$$

where cos_sim represents the cosine similarity, $\vec{v}_{dest}$ represents the first encoded vector, and $\vec{v}_{seed}$ represents the second encoded vector.

6. The method of claim 1, further comprising, prior to step a), abstracting the first software file using an abstraction model.

7. The method of claim 6, wherein the abstraction model is trained with training data, the training data comprising a plurality of destination files, a plurality of seed files, and indications of which of the destination files are clones of which of the plurality of seed files.

8. The method of claim 1, wherein step e) compares the cosine similarity to a threshold value.

9. A computing device for identifying malicious software, comprising:
  a processor; and
  memory;
  wherein the processor and the memory cooperate to:
    a) encode a first software file using an encoder model to create a first encoded vector;
    b) select a malware file from a database of malware files;
    c) encode the malware file using the encoder model to create a second encoded vector;
    d) compute a cosine similarity between the first encoded vector and the second encoded vector; and
    e) determine whether the first software file is a clone of the malware file based on the cosine similarity;
  wherein the encoder model is trained with training data, the training data comprising a plurality of destination files, a plurality of seed files, and indications of which of the destination files are clones of which of the plurality of seed files.

10. The computing device of claim 9, wherein the processor and the memory further cooperate to repeat steps b), c), d), and e), with each file from the database.

11. The computing device of claim 10, wherein the processor and the memory further cooperate to:
  when none of the malware files from the database are determined to be the clone of the first software file, tag the first software file as safe.

12. The computing device of claim 10, wherein the processor and the memory further cooperate to:
  when at least one of the malware files from the database is determined to be the clone of the first software file, tag the first software file as unsafe.

13. The computing device of claim 9, wherein the cosine similarity is computed based on $$\cos\_sim_{(\vec{v}_{seed}, \vec{v}_{dest})} = \frac{\vec{v}_{seed} \cdot \vec{v}_{dest}}{\|\vec{v}_{seed}\| \cdot \|\vec{v}_{dest}\|}$$

where cos_sim represents the cosine similarity, $\vec{v}_{dest}$ represents the first encoded vector, and $\vec{v}_{seed}$ represents the second encoded vector.

14. The computing device of claim 9, wherein the processor and the memory further cooperate to, prior to step a), abstract he first software file using an abstraction model.

15. The computing device of claim 14, wherein the abstraction model is trained with training data, the training data comprising a plurality of destination files, a plurality of seed files, and indications of which of the destination files are clones of which of the plurality of seed files.

16. The computing device of claim 9, wherein step e) compares the cosine similarity to a threshold value.

17. A non-transitory computer readable medium having stored thereon executable code for execution by a processor of a computing device, the executable code comprising instructions for:

a) encoding a first software file using an encoder model to create a first encoded vector;

b) selecting a malware file from a database of malware files;

c) encoding the malware file using the encoder model to create a second encoded vector;

d) computing a cosine similarity between the first encoded vector and the second encoded vector; and e) determining whether the first software file is a clone of the malware file based on the cosine similarity;

wherein the encoder model is trained with training data, the training data comprising a plurality of destination files, a plurality of seed files, and indications of which of the destination files are clones of which of the plurality of seed files.

\*   \*   \*   \*   \*